(12) United States Patent
Schneider et al.

(10) Patent No.: US 8,438,435 B2
(45) Date of Patent: May 7, 2013

(54) METHOD FOR TESTING AN ADDRESS BUS IN A LOGIC MODULE

(75) Inventors: Thomas Schneider, Markgroeningen (DE); Peter Wirth, Waghaeusel (DE); Otto Pfitzer, Sonnenbuehl (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 12/738,253

(22) PCT Filed: Sep. 10, 2008

(86) PCT No.: PCT/EP2008/061998
§ 371 (c)(1),
(2), (4) Date: Sep. 22, 2010

(87) PCT Pub. No.: WO2009/049970
PCT Pub. Date: Apr. 23, 2009

(65) Prior Publication Data
US 2011/0202803 A1    Aug. 18, 2011

(30) Foreign Application Priority Data
Oct. 15, 2007 (DE) .................. 10 2007 049 354

(51) Int. Cl.
*G01R 31/28*    (2006.01)

(52) U.S. Cl.
USPC .................................... 714/724; 714/718

(58) Field of Classification Search ............ 714/718, 714/724
See application file for complete search history.

(56) References Cited

U.S. PATENT DOCUMENTS 5,436,856 A * 7/1995 Sauvage .................. 702/120
7,096,393 B2 * 8/2006 Caty et al. ................ 714/718

FOREIGN PATENT DOCUMENTS

| DE | 102 26 876 | 12/2003 |
| JP | 6-180657 | 6/1994 |
| JP | 09-016483 | 1/1997 |

OTHER PUBLICATIONS

International Search Report for PCT/EP2008/061998, dated Dec. 23, 2008.
English Language Abstract of JP 09-016483.
English Language Abstract of DE 102 26 876.

\* cited by examiner

*Primary Examiner* — Sam Rizk
(74) *Attorney, Agent, or Firm* — Kenyon & Kenyon LLP

(57) ABSTRACT

In a method for testing an address bus in a logic module, a logic module, a computer program and a computer program product, the method provides for a logic module to have at least one data register, into which addresses detected by the address decoder are written.

20 Claims, 2 Drawing Sheets

METHOD FOR TESTING AN ADDRESS BUS IN A LOGIC MODULE

FIELD OF THE INVENTION

The present invention relates to a method for testing an address bus in a logic module, such a logic module, a computer program and a computer program product.

BACKGROUND INFORMATION

In electronic logic modules such as application-specific integrated circuits (ASIC) for example, data lines or buses are used for communication between the individual components. In an ASIC, typically a microprocessor or a microcontroller is connected to several elements such as a memory and several input-output units for example, a data bus being provided for transmitting the actual data. An address bus, which transmits only memory addresses, is provided for controlling the individual components or also memory areas in the memory. For generating the required address signals, an address decoder is usually provided such that elements connected to the microprocessor can be controlled or addressed directly using the address signals.

For testing the operability of the individual elements of the logic module, address bus tests are provided among other things, in which memory areas in the memory are written in order to check the operability of connecting lines. For this purpose, values are written in all memory locations and the presence of all written values is checked. In a memory area of a size of 1 kb, 1,024 numbers are thus written and each number is checked individually. If one or several numbers are missing, then the address bus connection is defective.

For testing the data bus, usually several predefined values are written into a data register and read back again. In the event of full operability, it is possible to write and read any value, in this case, at a width of 16 bits, this amounts to 65,535 values.

A similar test must be performed to ensure the operability and integrity of the address bus in an ASIC. In this instance, however, one must be mindful of the fact that writing to registers in an ASIC may inadvertently trigger functions. In a test access operation, reactions may be triggered that are not plausible or legally not secured.

SUMMARY

The method according to example embodiments of the present invention is used to test an address bus in a logic module, at least one data register being provided in the logic module, into which an address detected by the address decoder in an access operation is transmitted or written, which may be read out for testing the operability of the address bus.

For this purpose it may be provided that the address detected by the address decoder in an access operation, which is written into the data register, is read out in a subsequent access operation, typically the immediately following access operation. The read-out value makes it possible to test whether the address decoder detected or read the correct address.

In a refinement, the data bus is tested by writing standard values into a preferably non-critical memory location in the logic module.

The method, in particular the transmission of the addresses detected in an access operation, may be applied in a read access or a write access operation.

It is advantageous to use the presented method in testing circuit traces.

The logic module according to example embodiments of the present invention is provided in particular to implement the above-described method and has at least one data register, into which the addresses detected by the address decoder may be transmitted or written, which addresses may be read out for testing the operability of the address bus.

The logic module may be an ASIC (application-specific integrated circuit) for example such as is used e.g. for controlling an integrated RADAR component in an active cruise control (ACC).

The computer program according to example embodiments of the present invention includes program code for implementing all steps of an above-described method when the computer program is executed on a computer or a corresponding computing unit, in particular on a logic module of the aforementioned kind.

The computer program product according to example embodiments of the present invention includes the program code, which is stored on a computer-readable storage medium. Any internal or external recording medium may be used as a storage medium.

At least in its developments, example embodiments of the present invention allow for the bus connections in a logic module to be tested non-invasively. In this context, non-invasive means that no data are written into the logic module in order to test the address bus. To perform the test, a data register (PREVIOUS_ADDRESS) is integrated in the logic module, in one case in the ASIC, which contains the address of the most recently performed write or read access. This is achieved by transferring the address detected by the address decoder into the data register. The content of the data register may be read out in the next read access.

By reading out each address it is possible to verify whether the address decoder read the correct address. This is achieved by reading out the PREVIOUS_ADDRESS data register following the read operation.

Thus a test value applied to the address bus is "mirrored" on the data bus. The data bus is tested for example by writing standard values in a non-critical memory location in the ASIC. Consequently, the integrity of the address bus is verified via the integrity of the data bus.

Further advantages and developments of example embodiments of the present invention are derived from the description and the accompanying drawing.

It is understood that the aforementioned features, to be explained below, may be used not only in the respectively indicated combination, but also in other combinations or by themselves, without leaving the scope of the present invention.

Example embodiments of the present invention are represented schematically in the drawing and are described in more detail below with reference to the drawing.

DETAILED DESCRIPTION

Figure 1:
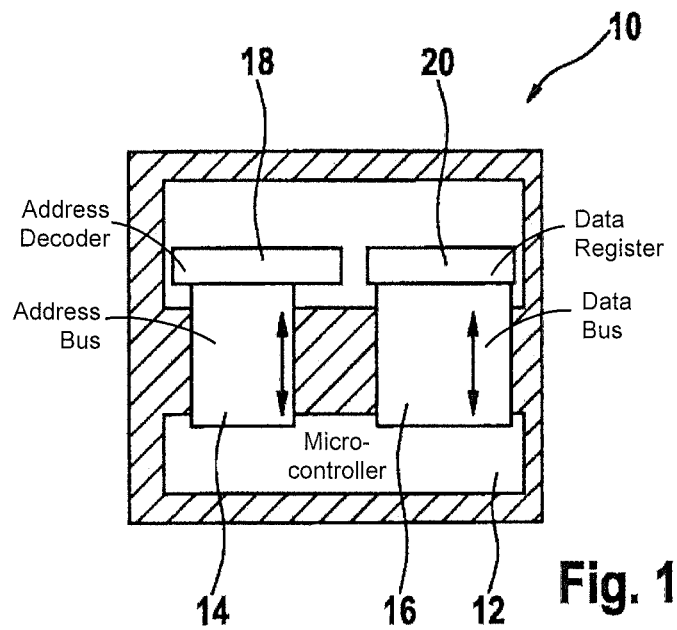
FIG. 1 schematically depicts a logic module according to an example embodiment of the present invention.

FIG. 1 provides a schematic representation of a circuit board which is indicated as a whole by reference numeral 5.

This circuit board 5 carries a logic module 10 in the form of an ASIC, a microcontroller 12, an address bus 14, a data bus 16, an address decoder 18 and a data register 20. Logic module 10 is used to control an integrated radar component in an ACC (active cruise control).

Via address bus 18, microcontroller 12 is able to address specific memory areas, the data being transmitted via data bus 16.

Figure 2:
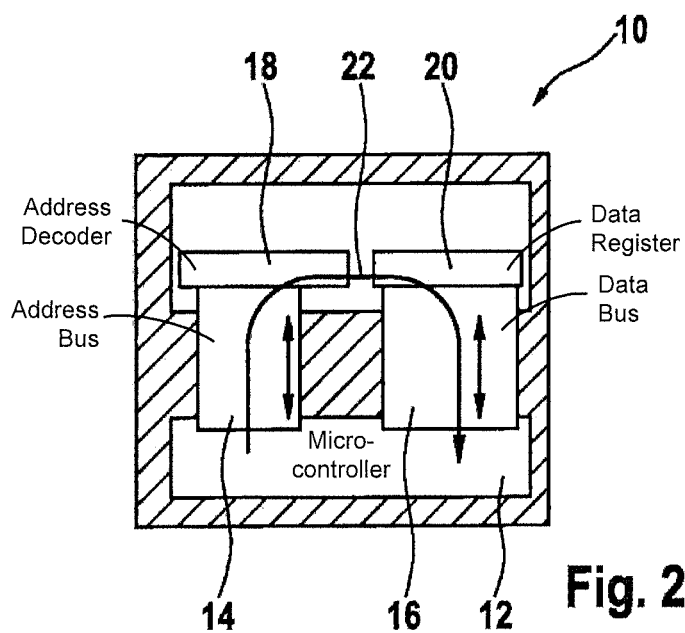
FIG. 2 depicts the logic module from FIG. 1 to illustrate the principle of the method of example embodiments of the present invention.

The described method is now explained with reference to FIG. 2, which also shows circuit board 5 having logic module 10, microcontroller 12, address bus 14, data bus 16, address decoder 18 and data register 20.

When microcontroller 12 accesses a component or a memory area in logic module 10, address decoder 18 generates an address signal or address signals on the basis of the detected address and transmits this detected address additionally to data register 20. This data register 20 may now, e.g. in the next read access, be read out so that it becomes possible to verify whether address decoder 18 detected or read the correct address. In this manner, a test value applied on address bus 14 is mirrored on data bus 16, as indicated by arrow 22, which describes the path of a test value. The test may be used to verify the operability of address bus 14.

Data bus 16 is tested by writing standard values to a non-critical memory location in logic module 10 such that the integrity of address bus 14 is verified via the integrity of data bus 16.

Figure 3:
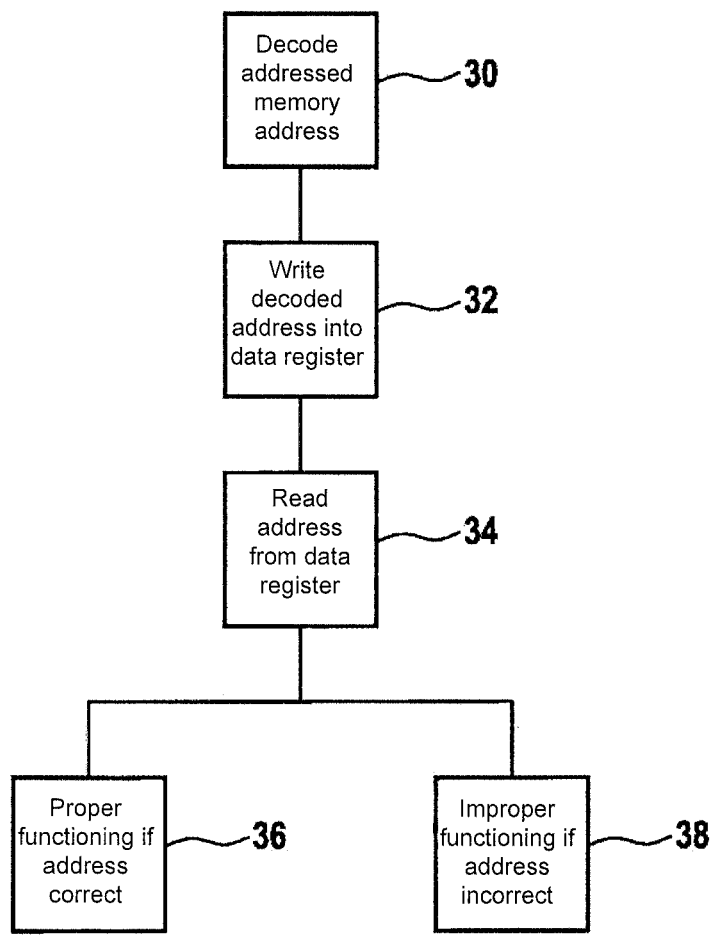
FIG. 3 depicts a method according to an example embodiment of the present invention in a flow chart.

FIG. 3 illustrates in a flow chart a method according to an example embodiment of the present invention.

In a first step 30, a computing unit in a logic module accesses a memory area in a memory of the logic module. In the process, the memory area to be controlled is addressed by an address decoder, which in turn writes the detected address into a data register in a subsequent step 32. In a subsequent read access operation in a step 34, this address register is read out and typically after testing the data bus a determination is made as to whether the address bus is functioning properly (block 36) or not (block 38).

The integrity of the address bus is thus verified via the integrity of the data bus, a test value applied on the address bus being mirrored on the data bus.

The described method is suitable especially for logic modules such as ASICs for example, in which conventional address bus test, in which values are written into memory areas and the presence of the written values is checked, may result in undesired functions. This is avoided in the non-invasive test method according to example embodiments of the present invention.

What is claimed is:

1. A method for testing an address bus in a logic module, the logic module also including a data register, a memory, a data bus and an address decoder, the method comprising:
   providing on the address bus an address to a location in the memory;
   decoding the address by the address decoder;
   writing the decoded address into the data register; and
   reading out the data register onto the data bus to test operability of the address bus.

2. The method according to claim 1, wherein the data register is read out in a subsequent read access operation.

3. The method according to claim 1, further comprising testing the data bus by writing standard values in a memory location in the logic module.

4. The method according to claim 1, wherein the method is performed as part of a read access to the memory.

5. The method according to claim 1, wherein the method is performed as part of a write access to the memory.

6. The method according to claim 1, wherein the method is used for testing circuit traces.

7. The method of claim 1, wherein the logic module is an integrated circuit for controlling an integrated radar component in an active cruise control system.

8. A logic module, comprising:
   a memory;
   a data bus;
   an address bus to receive an address to a location in the memory;
   an address decoder to decode an address received by the address bus; and
   a data register for receiving and storing the decoded address from the address decoder, and providing its stored contents to the data bus to test operability of the address bus.

9. The logic module according to claim 8, wherein the logic module is arranged as an ASIC.

10. The logic module according to claim 8, wherein the data register is read out in a subsequent read access operation.

11. The logic module according to claim 8, wherein the data bus is tested by writing standard values in a memory location in the logic module.

12. The logic module according to claim 8, wherein the receiving the address is performed as part of a read access to the memory.

13. The logic module according to claim 8, wherein the receiving the address is performed as part of a write access to the memory.

14. An integrated circuit for controlling an integrated radar component in an active cruise control system, the integrated circuit comprising the logic module of claim 8.

15. A non-transitory computer-readable storage medium having program instructions, which when executed by a processor perform a method for testing an address bus in a logic module, the logic module also including a data register, a memory, a data bus, and an address decoder, the method comprising:
   providing on the address bus an address to a location in the memory;
   decoding the address by the address decoder;
   writing the decoded address into the data register; and
   reading out the data register onto the data bus to test operability of the address bus.

16. The non-transitory computer-readable storage medium of claim 15, wherein the data register is read out in a subsequent read access operation.

17. The non-transitory computer-readable storage medium of claim 15, the method further comprising testing the data bus by writing standard values in a memory location in the logic module.

18. The non-transitory computer-readable storage medium of claim 15, wherein the method is performed as part of a read access to the memory.

19. The non-transitory computer-readable storage medium of claim 15, wherein the method is performed as part of a write access to the memory.

20. The non-transitory computer-readable storage medium of claim 15, wherein the logic module is an integrated circuit for controlling an integrated radar component in an active cruise control system.

* * * * *

UNITED STATES PATENT AND TRADEMARK OFFICE
CERTIFICATE OF CORRECTION

PATENT NO. : 8,438,435 B2  Page 1 of 1
APPLICATION NO. : 12/738253
DATED : May 7, 2013
INVENTOR(S) : Schneider et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this
Eighth Day of September, 2015

Michelle K. Lee
*Director of the United States Patent and Trademark Office*